March 23, 1965    R. LEMAIRE    3,174,700
WINDING APPARATUS

Filed May 31, 1961    5 Sheets-Sheet 1

INVENTOR:
ROLAND LEMAIRE
BY
Karl F. Ross
AGENT.

March 23, 1965  R. LEMAIRE  3,174,700
WINDING APPARATUS
Filed May 31, 1961  5 Sheets-Sheet 2

INVENTOR:
ROLAND LEMAIRE
BY
Karl G. Ross
AGENT.

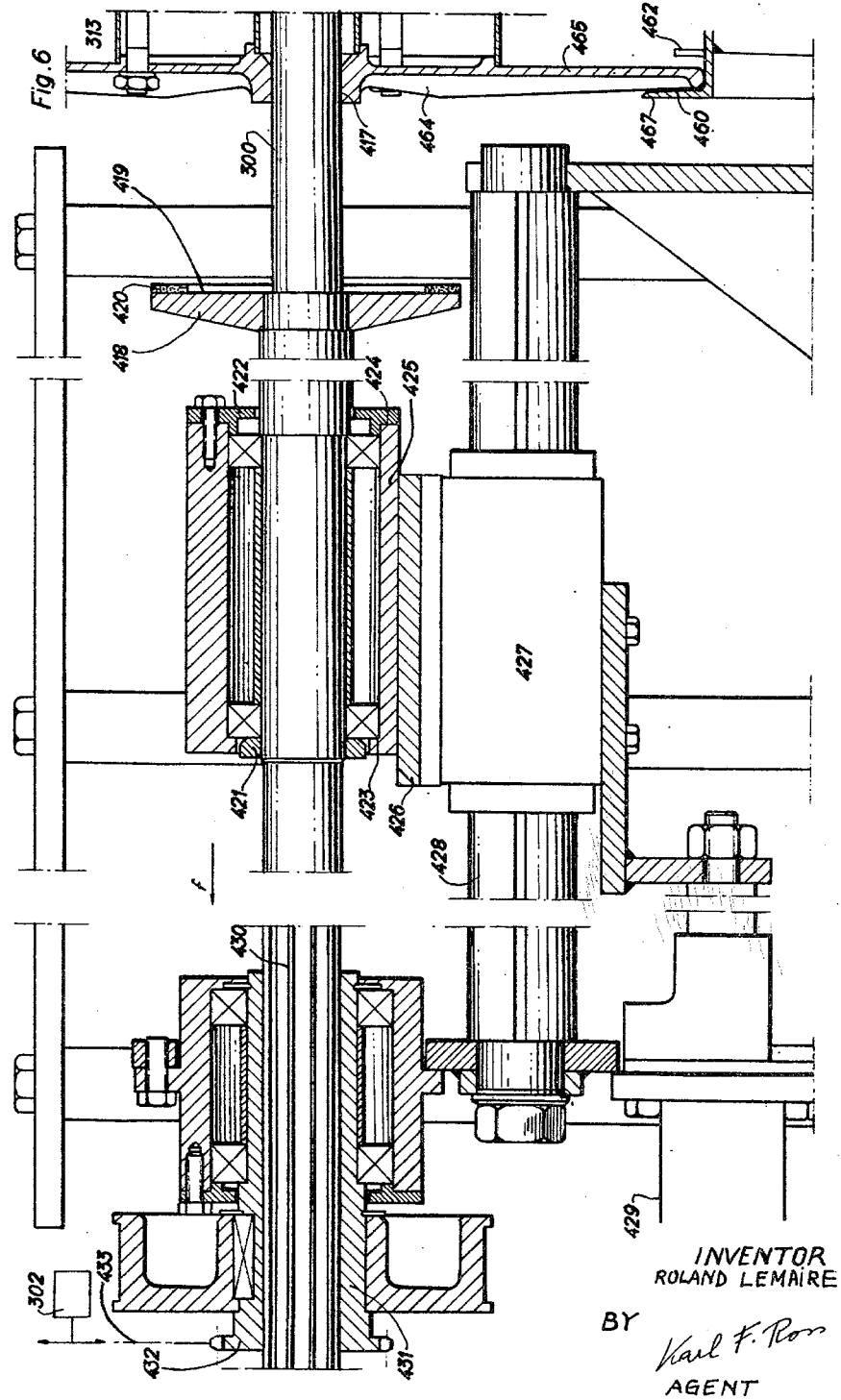

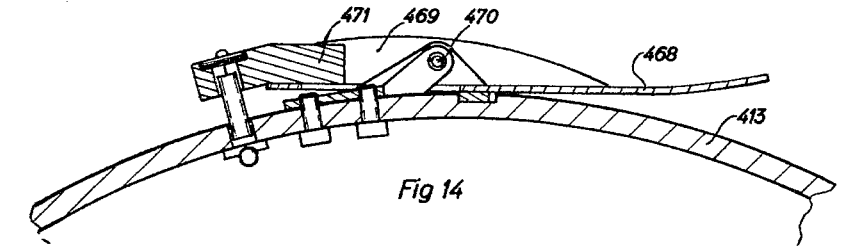
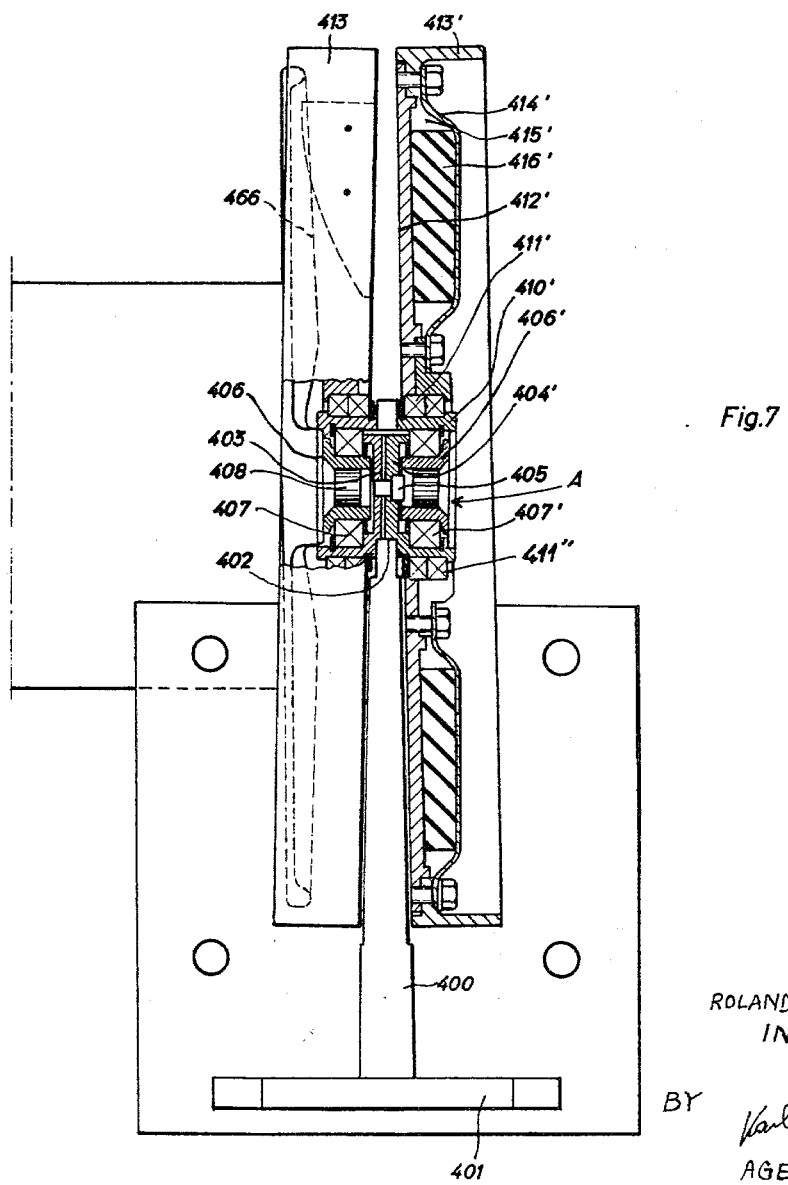

March 23, 1965 R. LEMAIRE 3,174,700
WINDING APPARATUS
Filed May 31, 1961 5 Sheets-Sheet 5
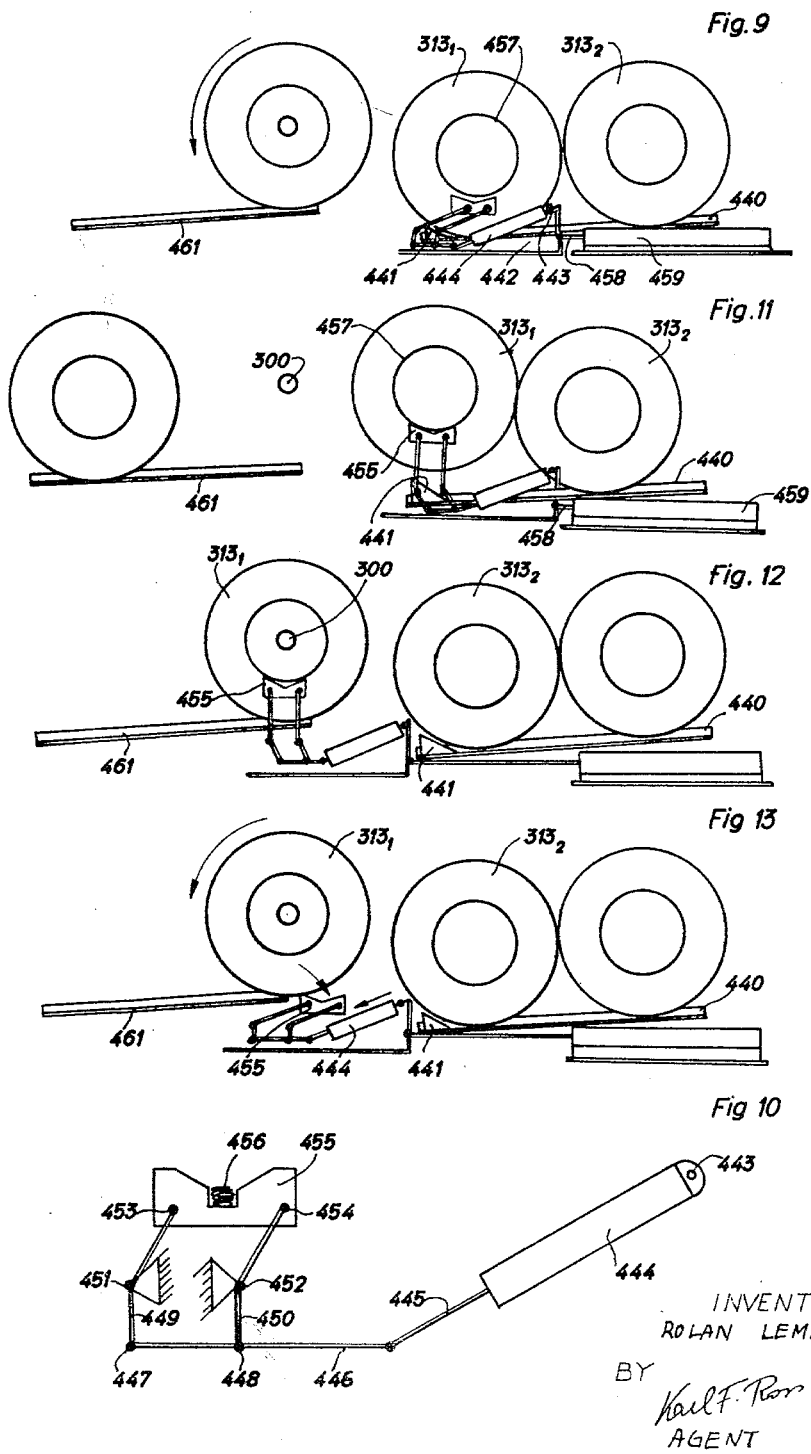

United States Patent Office 3,174,700
Patented Mar. 23, 1965

3,174,700
WINDING APPARATUS
Roland Lemaire, Fere-en-Tardenois, Aisne, France,
assignor to Etudes & Fabrications, Paris, France, a
corporation of France
Filed May 31, 1961, Ser. No. 113,843
Claims priority, application France, June 1, 1960,
828,810
7 Claims. (Cl. 242—18)

This invention relates to continuous winding apparatus of the type serving to wind flexible linear elements about reels, bobbins, sheaves or similar winding members, and in which the flexible linear element is alternately wound about each of a pair of companion winding members, being automatically switched over from one to the other as each member is filled to capacity, so that the winding operation proceeds continously. In the present specification and claims the expression "flexible linear element" is used broadly to designate any such elements of the class including yarns, rovings, threads, tapes, wires, cables, ropes, cords and the like. Sometimes the term "thread" will be used for brevity but it is to be understood that such use is not restrictive. Similarly the word "reel" will be used in a broad sense to include any winding or reeling member.

In winding apparatus of the kind referred to there are provided two winding stations at closely spaced positions, and common reciprocatory feeding mechanism for alternately feeding the flexible element in regular layers first to the winding members at one station until this member is filled, then to the winding member at the adjacent station, and so on repeatedly.

It is an object of this invention to provide a number of improvements in winding apparatus of the kind referred to above, whereby to broaden the range of usefulness of such apparatus, and simplify the construction and operation thereof.

It is an object of this invention to provide continuous winding apparatus capable of reeling the flexible linear elements at increased linear velocities of the elements and consequently to increase the output capacity of such apparatus, and to permit such apparatus being coupled to the output of a high-capacity unit continuously producing a flexible linear element, such as a roving frame or the like, while positively preventing the occurrence of breaks and other mishaps of the kind that might occur due to variations in linear velocity of the element between the output of the production unit and the input to the winding apparatus.

Another object is to provide improved apparatus for winding reels and the like which will operate in a fully automatic manner so that, in particular, no manual handling operations will be required in bringing empty reels to the winding stations and discharging filled reels therefrom.

The invention includes the following main features certain of which are applicable separately or in combination with others:

(1) Means are provided for imparting to a reel while still empty a rotational velocity corresponding to the desired linear reeling velocity of the thread to be fed to said reel, before the other reel at the cooperating winding station has actually been filled.

(2) Means are provided for regulating the output torque of the motor rotating a reel in process of being wound, under control of the tension as sensed in the thread being supplied thereto.

(3) Means for mounting and removing a reel on and from its drive shaft by axial sliding movement of the shaft in one or the opposite direction.

(4) Means whereby the empty reels are urged by gravity to a "pre-loading" position and means for thereafter bringing each empty reel in succession from the pre-loading position to a position in which its central mounting aperture is placed in register with an axially reciprocable drive shaft.

(5) Means for discharging the filled reels by gravity.

Exemplary embodiments of the invention will now be described with reference to the accompanying drawings, wherein:

FIG. 6 is a partial longitudinal sectional view of the means for supporting and driving a reel;

FIG. 7 shows means for supporting a pair of adjacent reels partly in elevation and partly in section;

FIG. 9 is a diagram illustrating the means for automatically delivering and discharging the reels;

FIG. 10 is a larger-scale view showing part of the automatic handling apparatus;

FIG. 11 is similar to FIG. 9 for another operating condition;

FIG. 12 similarly shows yet another operating condition;

FIG. 13 similarly shows a further operating condition; and

FIG. 14 is a larger-scale sectional view illustrating part of an annulus with a thread clamp member.

Figure 1:
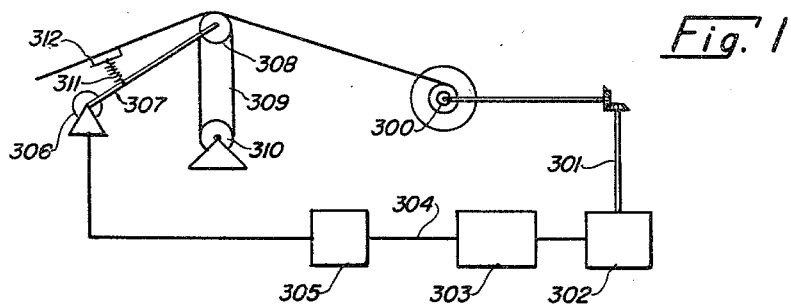
FIG. 1 is a diagrammatic illustration of underlying principles of the invention.

Referring first to the diagram of FIG. 1, a shaft 300, serving to rotate an empty reel 313 prior to a winding operation, is driven through transmission 301 from an electric slip motor 302, the output torque of which is controllable by a suitable regulator 303 in response to an electric control signal. A control signal is applied to the regulator 303 for determining the output torque of the motor 302 via a conductor 304 from an electronic amplifier 305 from a senser device 306 such as a signal generator mechanically operated by the angular position of an arm 307. The arm 307 is articulated coaxially with senser 306 and carries on its free end a pulley 308 pivoted to it and constituting the upper one of a pair of pulleys including a fixed lower pulley 310 together providing a thread accumulator and tension-responsive device 309. A spring 311 biases the arm 307 in one direction of rotation to urge the pulley 308 upwardly against the downwardly acting forces applied thereto upon tensioning of the thread. Should the tension of the thread 312 to be wound around the reel 313 tend to vary for any reason, such as an increase in the reeling diameter, the angular position of arm 307 is varied correspondingly and an electric voltage of one or the other polarity or phase condition with respect to a reference voltage, is applied from senser 306 to the input of amplifier 305; the amplified signal is then applied to regulator 303 via conductor 304 to vary the torque output of motor 302 in the requisite sense to oppose the variation in tension of the thread 312, i.e. to increase the torque upon slackening or to decrease it upon excessive tensioning.

Figure 2:
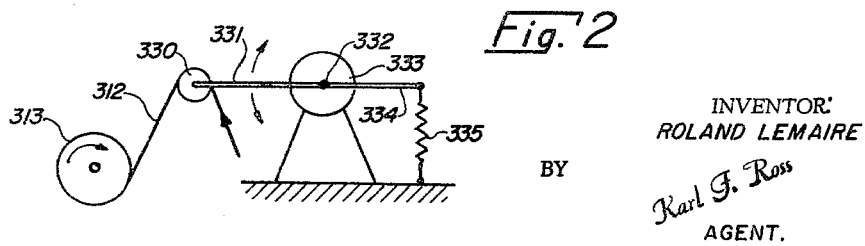
FIG. 2 illustrates a modification in part of the apparatus.

In the modified tension-sensing arrangement shown in FIG. 2, the thread 312 ahead of the reel 313 is passed over a pulley 330 carried on one end of a lever arm 331 mounted for angular displacement about an axis 332 identical with that of sensor or signal-transmitter device 332, the opposite end of arm 331 being biased by a spring 335. This arrangement constitutes a modification of the arrangement including the tension-responsive pulley device 309, arm 307 and signal transmitter 306 in FIG. 1; the device 332 thus supplies an amplifier 305 to modify the torque of motor 302 as precisely described.

Figure 3:
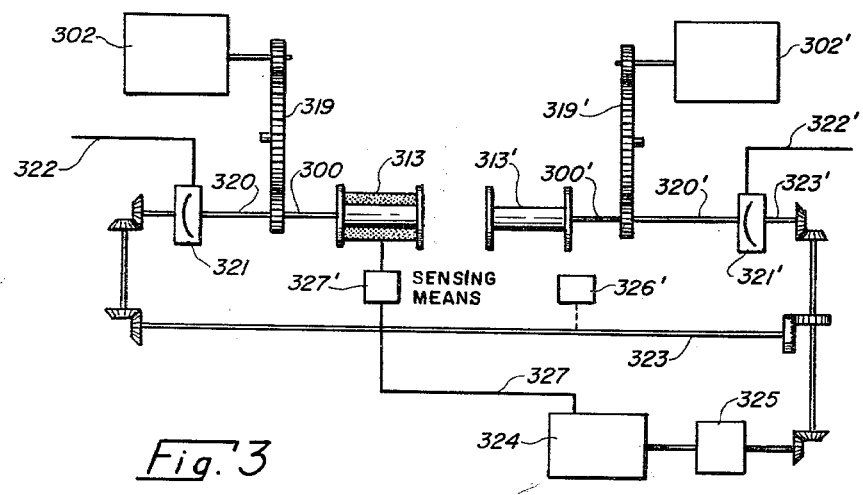
FIG. 3 is a diagrammatic illustration showing a drive system for alternately rotating a pair of reels in accordance with the invention.

Referring now to FIG. 3, there is illustrated a reel 313 which is in process of winding at one winding station, being mounted on a shaft 300 driven through a transmission 319 from motor 302. An empty reel 313' is supported at the adjacent winding station upon a shaft 300' drivable from a motor 302' through transmission 319'. Each reel drive shaft 300, 300' is, further, drivable from the output element of a respective (e.g. electromagnetic) clutch 321 or 321' operable between its engaged and disengaged conditions by way of an electric energizing connection 322 or 322'. The input elements 323 and 323' of the clutches are driven by a common asynchronous motor 324 by way of a speed-varying device 325. An angular-velocity indicator 326', which may be conveniently calibrated in units of linear thread velocity such as meters per minute, is driven from the output of the speed variator 325.

When the reel 313 has been filled to capacity, the asynchronous motor 324 is automatically started by way of energizing circuit 327 in response to sensing means 327'. The speed-varying device 325 is so adjusted, as permitted by indicator 326', that with the clutch 321' energized, the empty reel 313' is driven at the correct angular rate that will be required at the start of the reeling operation. The slip motor 302', at this time deenergized, is driven at a corresponding velocity by way of transmission 319'. At the instant the thread is switched over from the full reel 313 to the empty reel 313', the motor 324 is deenergized and motor 302' is simultaneously energized in the usual manner, while clutch 321' is at the same time disengaged by way of energizing circuit 322'. Thus the reel 313' at the instant it commences the effective thread reeling operation is revolving at the correct speed and hence imparts the correct reeling tension to the thread, owing to the fact that its drive motor 302' at the time it is energized is already rotating at the proper speed. Thereafter the speed of motor 302' is immediately monitored, and continues to be monitored throughout the reeling operation, by way of the tension-responsive torque-regulating device described above with reference to FIG. 1 or 2.

At the time of the switch-over of the thread from reel 313 to 313', the drive motor 302 is simultaneously deenergized. As the reeling of the thread upon reel 313' approaches completion, motor 324 is again started. Meanwhile it will be understood that the full reel 313 has been removed from shaft 300 and an empty reel has been inserted instead. The freshly inserted reel 313 is now driven from motor 324 through transmission 323–320, clutch 321 being now engaged, and motor 324 simultaneously acts through transmission 319 to drive motor 302 at the proper initial reeling velocity. At the next switch-over time, after the reel 313' has been filled, the process is again repeated to condition the reel 313 for an effective thread reeling operation, as described above in connection with the condition of reel 313'.

Figure 4:
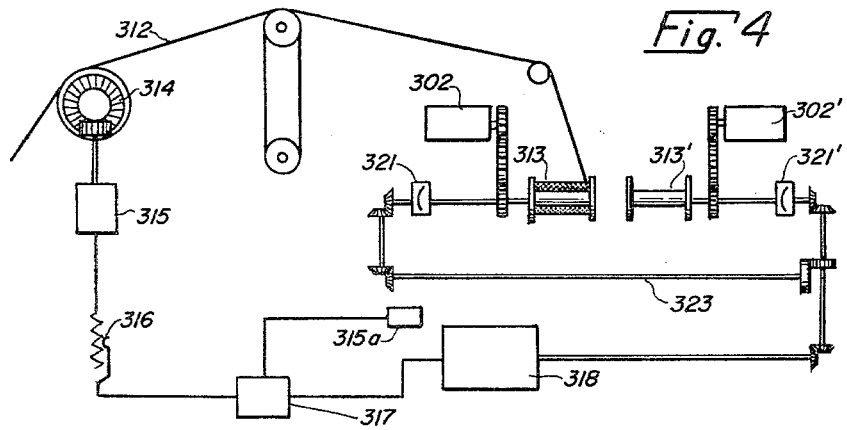
FIG. 4 is similar to FIG. 3 but illustrates a different embodiment.

In the modification shown in FIG. 4, the factor controlling the servo-system is the angular velocity of the capstan or sheave 314 about which the thread is entrained at its input to the winding apparatus. The sheave 314 drives of rate generator 315 delivering a rate voltage, the initial or null value of which is adjustable by means of a potentiometer 316, and said rate voltage is applied to one input of a comparator device 317 (e.g. a conventional bridge circuit) the other input of which is supplied with a constant-voltage signal from a generator 315a. The differential output signal from comparator 317 is applied to the input of a D.-C. motor 318 which drives the empty reel 313' by way of clutch 321', thereby regulating the motor drive rate in accordance with the output signal at the correct value as determined by the velocity of thread 312. A decrease in the thread velocity will thus yield a reduced output and, consequently, produce a slower rotation of motor 318 and vice versa.

Figure 5:
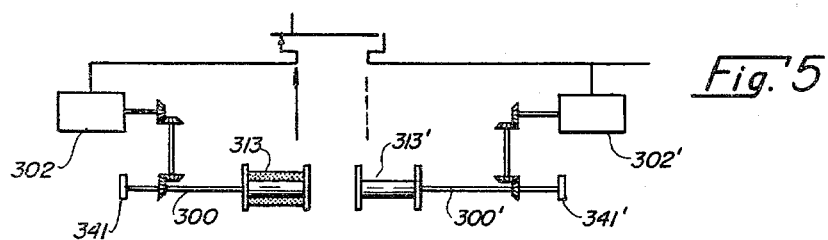
FIG. 5 illustrates yet another modification.

The invention further contemplates an embodiment which eliminates the requirement of a special starting motor such as motor 324 in FIG. 3. Referring to FIG. 5, the reel drive shafts 300 and 300' carry respective brake drums 341 and 341'. On approaching completion of the reeling process on one reel, say 313, an energizing voltage is applied to the slip motor 302' driving reel 313', which is not now being wound, at a speed depending on the retarding torque applied through brake drum 341'. This torque is initially adjusted so that the drive velocity of reel 313' corresponds precisely to the desired velocity at which the reel is to be driven at the instant it will receive the thread on switch-over from the companion reel 313.

According to a modification, adjustment of the initial reeling velocity is effected by adjusting the energizing voltage for the slip motor 302 or 302', e.g. with an autotransformer, rather than by way of a retarding torque applied through a brake.

In both last described embodiments of the apparatus, means are desirably provided for stabilizing the electric voltage derived from the available power source.

It should be understood that the invention may be applicable using other controllable drive means than those shown, such as hydraulic, pneumatic, electric, electromagnetic or the like.

Reference will now be had to the detail views of FIGS. 6 and 7. The apparatus shown comprises a standard 400 upstanding from a base 401 and positioned generally in the longitudinal mid-plane of the machine. The standard 400 is formed with a recess 402 in which is arranged a symmetrical bearing assembly comprising two flanges 403 and 404 interconnected by a screw 405, whereby removal of the screw permits ready removal of the assembly. Each bearing includes a thrust abutment 406, 406' respectively supported on antifriction bearings 407, 407'. The thrust bearing 406–407 receives one end 408 of a reel drive shaft 300; and the arrangement is symmetrical to opposite sides of the longitudinal mid-plane, so that on the other of said plane is positioned the other reel drive shaft 300'. Rotatably mounted on the outer cage 410' (described with respect to the right side of the apparatus as seen in FIG. 7), by way of a pair of ball bearings, is the radial flange 412' of an annular crown or annulus 413' open in the direction of its co-operating shaft (FIG. 7). A rubber ring 414' defines a space 415' in which a resilient cushioning pad 416' is positioned. The annulus 413, 413' and its flanges 412, 412' forms with the respective pad 416' etc. a spool-mounting means adjacent the respective bearing and releasably engageable with a respective spool aligned therewith.

The shaft 300 is arranged for insertion into the central aperture or eye 417 (FIG. 6) of a reel or bobbin 313, and carries a disc 418 the inner face 419 of which is provided with a rubber lining 420. Shaft 300 is journalled in a bearing 425 supported on a slider 426, 427 slidable in a slideway 428 and connected with an actuator piston rod 429. The shaft 300 includes a splined section 430 on which is mounted the hub 431 of a schematically illustrated sprocket 432 driven through a sprocket chain 433 from motor 302.

During the effective thread-reeling stage of the process, the reel 313 is driven in rotation through frictional engagement between the lining 420 and the radial vanes or fins 464 provided on the side flange 465 of the reel. Pressure engagement of the opposite face 466 of the vanes 464 against the rubber ring 414 cushioning pad 416 (FIG. 7) results in rotation of the annulus 413.

Figure 8:
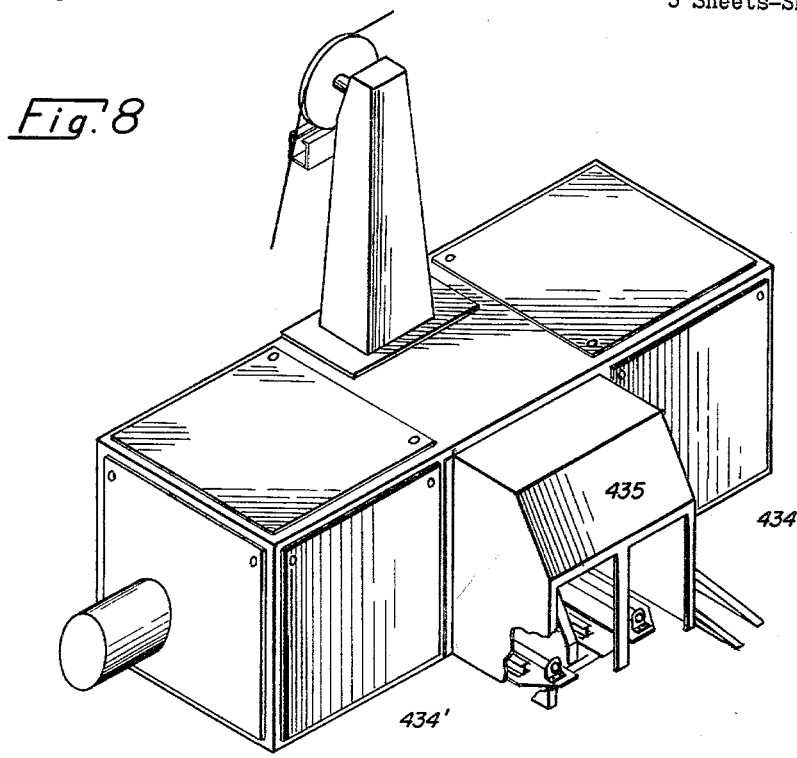
FIG. 8 is a simplified perspective view of the machine from the rear.

Automatic reel-changing means are provided. Referring to the perspective view of FIG. 8, which illustrates a housing including the two spaced housing sections 434 and 434' in which the respective winding stations are positioned, it is seen that a hood 435 projects from the rear side of the unit between the two spaced sections, and beneath the hood there are provided two similar and symmetrical assemblies for automatically delivering empty reels to position and discharging filled reels. Each of these charging and discharging assemblies has a string of empty reels supplied thereto. FIG. 9 illustrates two such empty reels 313–1 and 313–2 positioned on tracks or runways 440, inclined downwardly toward the charging station. A shoe 441 is provided for blocking the feed of the reels. The shoe 441 is mounted on a support 442 which carries an actuator cylinder 444 pivoted thereto at 443, with an actuator piston rod 445 (see FIG. 10) pivotally connected to a link 446. Pivotally connected to spaced points 447 and 448 of the link are the lower ends of respective bell-crank levers 449 and 450 having their intermediate points pivoted at 451 and 452. The upper ends 453 and 454 of the levers provide a deformable parallelogram linkage with the pivots 451 and 452, and are pivoted to a supporting block 455, which may desirably be magnetized or may carry a magnet as shown at 456 adapted for cooperation with the hub 457 of a reel 313. The assembly 442 is supported from the free end of the movable part, e.g. piston rod 458 of a further actuator 459. Positioned transversely to the shaft 300 and spaced from the midplane of symmetry are two discharge tracks 460 and 461 (FIG. 6), inclined downwardly away from the charging station; the tracks are formed as channels with their inner flanges cut out as shown at 462 and 463.

The system described operates as follows:

On completion of the reeling process on a reel 313, the thread or other flexible linear element is cut off by conventional means, and the actuator 429 shifts shaft 300 axially in the direction of arrow f (FIG. 6). Reel 313 moves away from the midplane of the apparatus, disengaging annulus 413. During this movement the vanes 464 of the reel engage the flange 467 of rail 460, and the flange 465 of the reel is received within said rail through the cutout 462. The reel is thus blocked against further axial shifting movement, and as the shaft 300 continues to recede, said shaft gradually disengages the reel and releases it completely. The released reel is supported on the track 460 and 461 and moves down by its own weight along the tracks toward a storage area.

The rim of annulus 413 carries a pivoted clamp member 468 (FIG. 14) having a flange 469 pivoted about a pin 470 and having one end provided with a weight 471. So long as the annulus 413 is revolving, centrifugal force urges weight 471 outwardly, rocking the clamp 468 clockwise so that it engages and grips the thread positioned thereunder at the time of switch-over from one reel to the other, whereby the slack portion of said thread can be cut by a suitable cutter blade (not shown) positioned between the annulus 413 and annulus 413'. As the annulus 413 stops rotating after the filling of the related reel, clamp 468 moves away from the rim 413, thereby releasing the thread and enabling the reel 313 to be discharged as described above.

Thereafter the actuator 444 (FIG. 10) is operated to expand the actuator member 445, applying the supporting member 455 against the bottom of the hub of the reel 313–1 in waiting position, and raising the reel to the position shown in FIG. 11. The axis of the reel is thus brought to an elevation on a level with the spindle or shaft 300. In the next stage of the cycle the actuator 459 is operated in turn and expands its member 458 to bring the eye of reel 313–1 into accurate alignment with shaft 300 (FIG. 12) at this time in retracted position as explained earlier. In the next stage, operation of actuator 429 in the reverse sense results in projecting the shaft 300 axially to enter the eye of the reel. When the shaft has fully engaged the reel and is supporting it, the support member 455 is moved down by retraction of actuator 444 (FIG. 13) thus completely releasing the reel. The actuator 444 is then restored to the position of FIG. 9 by retraction of the movable actuator member 459. As the projection of shaft 300 continues, the lining 420 engages the fins 464 and the cushioning pad 416 is compressed; the final position is shown in FIG. 7. Accurate positioning against the face A of flange 406' is obtained. Operating conditions are identical on the other side of the apparatus except that they are displaced by one half the operating cycle.

It will be seen from the foregoing that with the improvements of the present invention an accurate regulation of the reeling rate is obtained, thus making it possible to effect the switch-over operation from a full reel to the empty companion reel at high linear velocities of the thread without any danger of thread breakage or other mishaps. The regulation thus achieved moreover is independent from the reeling torque and hence from the tension regulating process.

The entire kinematic drive chain involved in the reeling operations is powered from external means until the instant the thread is switched and is accordingly monitored by an appropriate tension regulating system.

For this purpose an asynchronous motor and speed variator may be used, or a D.-C. motor, such as a variable speed motor with the speed being directly controlled by the velocity of the thread, or an eddy-current drive, hydraulic coupler, hydraulic motor, and similar drive systems may be used including even a separate drive motor provided with separate regulating means, if desired.

In accordance with the invention, the annuli provided with the thread clamping means are independent from the reel and reel drive shaft, and are mounted on independent bearing means. Hence the machine can readily be arranged for automatic discharge of the reels in an axial direction.

It will be noted that the reel drive shaft is supported at both ends so that high speeds of rotation are permissible.

The thread clamp member is arranged to rock automatically for disengaging the thread in the stationary condition eliminating the requirement for any manual operation to permit unimpeded discharge of the reel. This in turn makes it possible to equip the apparatus with an automatic charger containing a store of reels.

What I claim is:

1. In an apparatus for winding thread upon a spool, in combination, support means formed with a bearing; a drive shaft journaled on said support means and axially shiftable toward and away from said bearing, said bearing being axially aligned with said shaft for entrainment thereby; spool-mounting means adjacent said bearing and coaxial therewith for releasably engaging a spool having a central aperture registerable with said bearing; control means for axially reciprocating said shaft between a first position wherein said shaft is remote from said bearing and forms a clearance for passage of a spool between said shaft and said bearing and a second position wherein said shaft passes through said aperture of said spool into engagement with said bearing, thereby rotatably entraining said spool; guide means adjacent said bearing for directing a spool released upon displacement of said shaft into said first position away from said spool-mounting means; and positioning means for shifting a spool in a direction transverse to its axis into registration with said bearing.

2. The combination as defined in claim 1 wherein said guide means includes a rail extending generally transversely to said axis adjacent said spool-mounting means, said rail having a spool-carrying surface and a flange extending transversely to said surface in the path of a spool axially carried by said shaft upon displacement thereof from said second to said first position thereby stripping said spool from said shaft.

3. The combination as defined in claim 1 wherein said positioning means comprises a deformable parallelogrammatic linkage articulated about an axis parallel to the axis of said shaft and engaging means mounted upon said linkage for displacement toward and away from said axis of said shaft and adapted to releasably carry a spool into the region thereof, and actuating means for displacing said linkage, said linkage lying substantially in a plane perpendicular to said shaft.

4. The combination as defined in claim 1 wherein said spool-mounting means is provided with an annular surface transverse to said axis and adapted to abut against a cheek of a spool, said surface being provided with a cushion of resilient material adapted to increase the frictional interengagement of surface and cheek.

5. The combination as defined in claim 4 wherein said spool-mounting means includes an annular crown having a flange forming with said surface a socket open in the direction of said shaft for receiving said spool, said flange being formed with thread-engaging means for seizing a thread to be wound upon a spool; said thread-engaging means including a hook pivoted on said flange about an axis parallel to the axis of said shaft and being weighted for displacement upon rotation of said flange to engage the thread while being arranged for disengagement from said thread upon cessation of rotation of said crown.

6. An installation for the continuous winding of a thread upon successive spools comprising a support provided with a pair of spool-mounting means on opposite sides of said support; a pair of drive shafts independently axially shiftable in the direction of a respective spool-mounting means, each of said spool-mounting means including a crown open in the direction of the respective shaft and coaxially rotatable therewith for engagement with the cheek of respective spools, and thread-engaging means on the periphery of each of said crowns for successive engagement with said thread upon positioning of a spool within the respective crown; and means operative for shifting said shaft into and out of driving engagement with the respective spools.

7. An installation as defined in claim 6 wherein each of said spool-mounting means surrounds a respective bearing aligned and engageable with the end of a respective shaft means, each of said shaft means being provided with control means for axially displacing it from a first position wherein the shaft means is spaced from the respective bearing means to permit insertion of a spool within the respective crown and a second position wherein the shaft means passes through a respective spool into engagement with the respective bearing for support thereby, and positioning means at each spool-receiving means for aligning respective spools with the shaft means.

References Cited in the file of this patent
UNITED STATES PATENTS

| | | |
|---|---|---|
| 2,509,250 | Roberts | May 30, 1950 |
| 2,608,355 | Bell et al. | Aug. 26, 1952 |
| 2,622,810 | Stream et al. | Dec. 23, 1952 |
| 2,663,507 | Soussloff | Dec. 22, 1953 |
| 2,772,054 | Herele et al. | Nov. 27, 1956 |
| 2,932,461 | Kimberly | Apr. 12, 1960 |
| 2,946,528 | Bunch | July 26, 1960 |

FOREIGN PATENTS

| | | |
|---|---|---|
| 1,117,576 | France | Feb. 27, 1956 |